(12) United States Patent
Lari et al.

(10) Patent No.: US 6,641,718 B2
(45) Date of Patent: Nov. 4, 2003

(54) AQUARIUM FILTERING SYSTEM

(76) Inventors: Nick Lari, 2959 Mercury Rd., Jacksonville, FL (US) 32207; Dave Flom, 1431 Ford Rd., Minnetonka, MN (US) 55305

(*) Notice: Subject to any disclaimer, the term of this patent is extended or adjusted under 35 U.S.C. 154(b) by 0 days.

(21) Appl. No.: 10/162,348

(22) Filed: Jun. 4, 2002

(65) Prior Publication Data

US 2003/0006177 A1 Jan. 9, 2003

Related U.S. Application Data

(60) Provisional application No. 60/295,781, filed on Jun. 4, 2001.

(51) Int. Cl.[7] ............................ A01K 63/04; B01D 35/14
(52) U.S. Cl. ................... 210/124; 210/169; 210/416.2; 119/259
(58) Field of Search .................. 119/259–262, 226–227; 210/169, 416.2, 123, 124, 126, 128, 129

(56) References Cited

U.S. PATENT DOCUMENTS

| | | | |
|---|---|---|---|
| 2,729,337 A | 1/1956 | Alferman | |
| 3,848,567 A | * 11/1974 | Garber, Jr. | |
| 4,220,530 A | 9/1980 | Gabriele | |
| 4,684,462 A | 8/1987 | Augustyniak | |

* cited by examiner

Primary Examiner—Joseph Drodge
Assistant Examiner—Terry K. Cecil
(74) Attorney, Agent, or Firm—Thomas C. Saitta

(57) ABSTRACT

An aquarium filtering system for gravity flow systems wherein a float valve is incorporated in the drain conduit from the aquarium, wherein the float valve is operated by the water level of filtered water within a sump, such that if the water level in the sump rises above a predetermined level due to inadequate water return to the aquarium, the drain conduit will be closed by the float valve. A pre-filter is incorporated in the drain conduit to filter water upstream of the float valve, with the filter preferably being a sock filter enclosed in a sealed housing which remains filled with water. Most preferably, the float valve and any pumps utilized in the system are submerged within the water in the sump to reduce noise.

20 Claims, 2 Drawing Sheets

AQUARIUM FILTERING SYSTEM

This application claims the benefit of U.S. Provisional Application Ser. No. 60/295,781, filed Jun. 4, 2001.

BACKGROUND OF THE INVENTION

This invention relates generally to the field of aquarium filtering apparatuses used to remove undesirable elements from aquarium water to maintain an optimum environment for the inhabiting fish. More particularly, the invention relates to systems where the filtering operation is performed externally to the aquarium tank, and which utilize a gravity, water pressure or siphon system to remove water from the aquarium, such that a suction pump is not required to draw or deliver water from the tank to the filtering mechanisms.

A problem encountered in conventional gravity, pressure or siphon-type filtering systems is that they lack adequate safeguards to prevent outflow of water from the tank in the event that water return is blocked, reduced or otherwise halted, such that the tank may be completely drained if the problem is not detected in time. This will result in the death of the marine life, and the removed water will overflow the filtration reservoir and cause damage to furniture, carpets, etc. A typical way to address this problem, as shown in U.S. Pat. No. 4,684,462 to Augustyniak, is to suspend a small, open-topped, water receptacle near the surface of the water within the aquarium. Water is drawn by the external filtering system directly from this overflow tank rather than from the aquarium itself. In the event that water removal exceeds water return to the aquarium, the water level in the aquarium drops below the top of the overflow tank and no further water can be flow out through the drain conduit. Such water overflow tanks are unsightly and reduce space within the aquarium. Furthermore, the return pumping means of the external filtration system will continue to operate, possible resulting in overheating and failure. An even less effective mechanism is shown in U.S. Pat. No. 4,220,530 to Gabriele, in which a visible indicator is triggered in the event that the filter media becomes clogged.

While some systems incorporate float valves to stop water flow under certain conditions, typically the valve is located upstream of the filters, meaning that the float valve mechanism itself may become inoperational due to contamination or debris. Such a system is shown in U.S. Pat. No. 2,729,337 to Alferman. An additional problem in many conventional systems is that the water return pumps are relatively noisy, as is the cascade box utilized in many systems.

It is an object of this invention, as described in more detailed below, to address and obviate the problems referenced above in connection with gravity, pressure or siphon filtering systems. It is an object of this invention to provide an aquarium filtration apparatus or system that incorporates one or more float valves to stop outflow from the aquarium in the event that return flow to the aquarium is blocked or reduced. It is a further object to position the float valve submerged within filtered water such that damage to the float valve operational mechanism from deleterious effects of the marine environment is reduced. It is a further object to provide at least one filtering means upstream of the float valve such that water passing through the float valve is processed to remove particulate matter and debris. It is a further object to provide the upstream filtering means within a sealed housing or chamber. It is a further object to position the return pump and any internal filtration pumps submerged within filtered water to reduce noise.

SUMMARY OF THE INVENTION

The invention comprises a filtering apparatus system for an aquarium or other liquid retaining means, where the water is delivered by gravity, water pressure or siphoning means to the filtering apparatus, such that a powered drain pump is not required to remove water from the aquarium tank. In a basic embodiment, the water from the tank is delivered through one or more float valves into one or more filtering means, such as a cascade box and filter sock, to remove undesirable particulates and other matter from the water. The filtered water is retained in a reservoir sump, and the level of the water in the sump operates the float valve. A pump returns the filtered water to the tank. In the event that the water level in the reservoir rises above a maximum desirable level, which would occur in the event that more water is being removed from the tank than is being returned to the tank due to failure of the return pump, blockage of the return conduit, loss of electrical power, etc., the float valve closes and the automatic withdrawal of water from the aquarium tank is stopped.

In an alternative and more preferred embodiment, the water flowing from the tank is first delivered to an enclosed housing which contains one or more filter socks or other filtering means, such that the water flowing from the aquarium tank is pre-filtered to remove large matter and debris prior to the water passing through the float valve. The water is then passed through other known filtering means and into the filter reservoir sump, from where it is pumped back into the aquarium by a return pump.

In a most preferred alternative embodiment, the float valve, the return pump and any secondary pumps for movement of the water within the filtration apparatus are positioned so as to be immersed below the surface of the water within the filter reservoir sump. In this manner the operational components of the float valve are less susceptible to damage from salt creep, mineral deposits, etc., and the noise of the pump or pumps is muted by the water in the reservoir sump.

DESCRIPTION OF THE INVENTION

In a most general sense, the invention comprises a filtering apparatus or system for an aquarium or similar liquid-retaining tank or system requiring filtration and return of the liquid, where the water or liquid is automatically drawn from the aquarium by gravity, water pressure or siphon effects, i.e., not by a powered pump means. The filtering system comprises components which automatically shut off the outflow from the aquarium in the event that water return to the aquarium is restricted or blocked, such as may occur in the event that the return conduit is blocked, the return pump fails or the power source operating the pump is disrupted.

Figure 1:
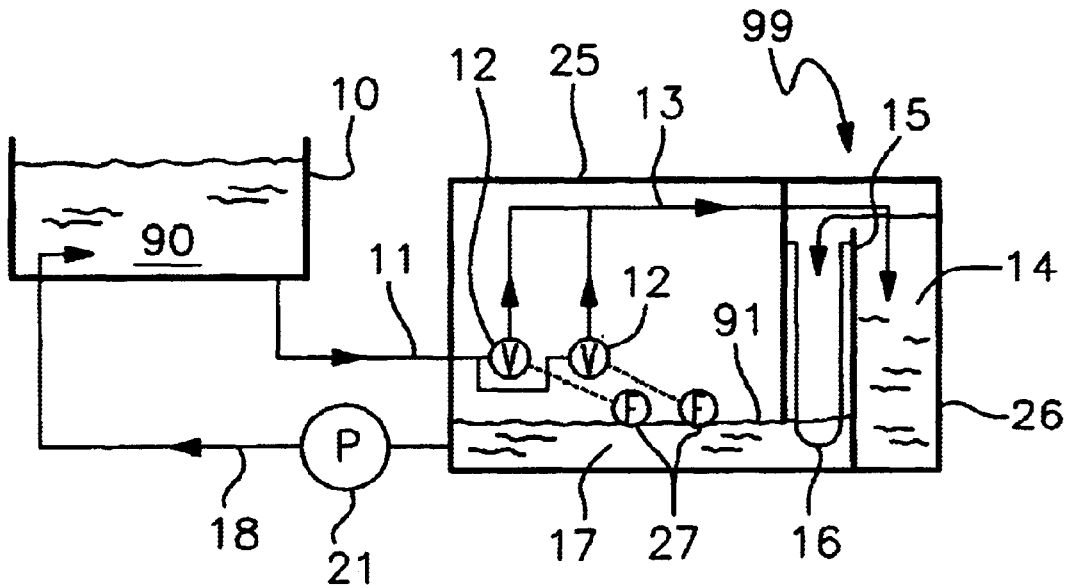
FIG. 1 is a schematic representation of the components of a basic embodiment of the invention, showing a pair of float valves and a cascade box and sock filter as the filtering means.

Referring now to FIG. 1, a basic embodiment of the invention is shown. Water 90 from an aquarium tank or other liquid reservoir 10 which requires the liquid to be filtered and returned to the aquarium 10 flows through outflow or drain conduit 11 and into filter system housing 26, generally a four-sided, bottomed, liquid container with a removable cover 25. Preferably, the drain conduit 11 is connected through the bottom of aquarium 10, such that no visible conduits are exposed to provide a more aesthetically pleasing exterior, but drain conduit 11 may also comprise suction conduits which extend over the top of the aquarium 10 and down into the interior. Water pressure, gravity or siphoning principles cause the water 90 to flow from the tank 10 into the filter system housing 26, such that no water removal pump is required.

The drain conduit 11 delivers unfiltered water 90 through one or more float valves 12 of conventional construction and operation, and then through interior conduits 13 into the filtering means 99, which as shown in FIG. 1 comprises a cascade box 14 where water 90 flows over an edge wall 15 and into one or more sock filters 16. Cascade boxes 14 and sock filters 16 are well known. The filtered water 91 collects in the filter reservoir sump 17, from which it is removed by return pump 21 for delivery back into the aquarium 10 through return conduit 18. The water surface level of the filtered water 91 in the sump 17 controls the condition of the float valves 12. In the event that the water level in the sump 17 exceeds a predetermined maximum level, which would occur in the event that insufficient water 91 is being returned to the aquarium 10 by pump 21 due to reduced or blocked water flow within return conduit 18, partial or total clogging of pump 21, power failure or inadvertent shutting off of pump 21, etc., the rising floats 27 will close float valves 12. This stops water flow through drain conduit 11 to insure that the aquarium 10 is not completely drained. When the problem is rectified, the water level in the sump 17 will drop as return pump 21 draws water 91 and returns it to the aquarium 10. This allows the floats 27 to drop to open float valves 12, such that water 90 again flows from aquarium 10 and the recycling filtering operation is restored to its normal operations.

Figure 2:
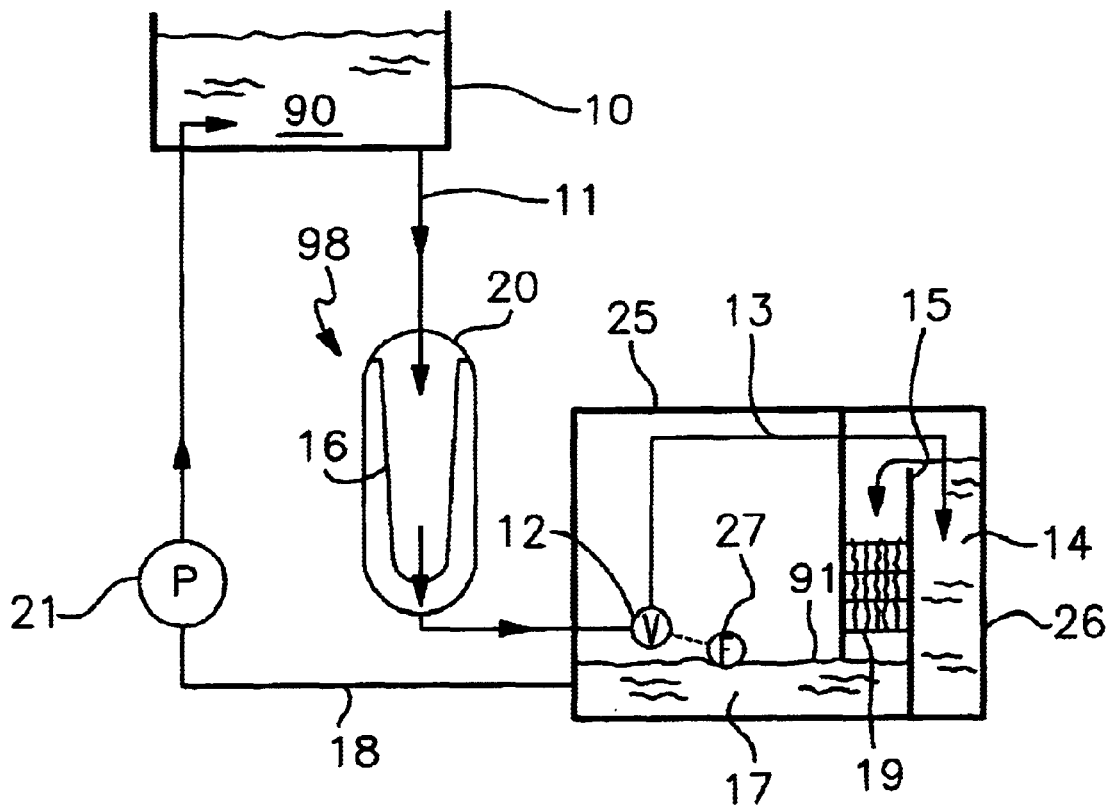
FIG. 2 is a schematic representation of the components of a second embodiment of the invention, showing a sock filter enclosed within a sealed housing as a first filtering means upstream of a float valve and additional filtering means.

FIG. 2 illustrates an alternative and more preferred embodiment of the filtering system, wherein a sealed pre-filter means 98 is placed in the drain conduit 11 upstream of, i.e., before the water 90 passes through, the float valve 12. This pre-filter means 98 removes any coarse particulates or debris which might clog the operating components of float valve 12. Most preferably, the pre filter means 98 comprises one or more sock filters 16 enclosed within a sealed housing 20 where flow into and out of the sealed housing 20 occurs only through drain conduit 11. In this manner, the closed housing 20 will remain completely filled with water during operation of the system, which silences the flow of water 90 into and through the sock filter 16 because air bubbles and cascade effects are no longer present to create noise. The float valve 12 operates as explained above to control water flow into the filter system housing 26 and filter means 99, which in this embodiment is shown to comprise a cascade box 14 and additional gravity flow filter media 19 of known type. In the event that the water level in the sump 17 rises above the predetermined maximum, the float 27 is lifted and valve 12 closes, shutting off water withdrawal from the aquarium 10.

Figure 3:
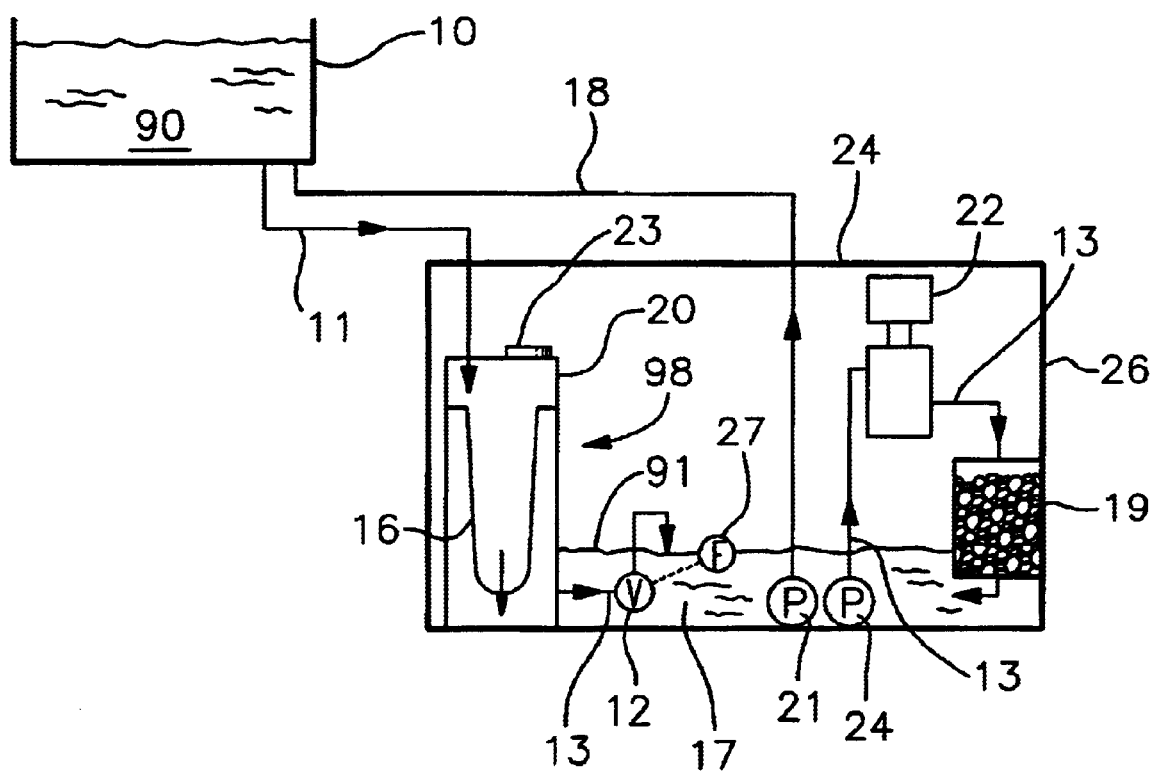
FIG. 3 is a schematic representation of a preferred embodiment of the invention, showing a sock filter enclosed within a sealed housing as a first filtering means upstream of a float valve and additional filtering means, where the float valve, the secondary internal pump and the return pump are disposed beneath the water level in the filter reservoir sump.

FIG. 3 illustrates the most preferred embodiment of the filtering apparatus system of the invention, wherein the pre-filter means 98, comprising a closed housing 20 having an access cap 23 and containing the sock filter 16, is positioned within the filter system housing 26 itself. Filtered water 91 from the pre-filter means 98 flows through float valve 12 directly into the sump 17. In this system, a secondary or internal pump 24 delivers water 91 to filter means 99, herein comprising a protein skimmer 22 and other filtering media 19, such as a biological filter, which delivers the multiple-filtered water 91 back into the sump 17, for delivery by return pump 21 back into the aquarium 10. In this embodiment, the float valve 12 operating mechanism, except obvious the float 27, the return pump 21 and the secondary pump 24 are positioned so as to be completely submerged or immersed below the water surface level in the sump 17. Placing the pre-filter means 98, the return pump 21 and the internal pump 24 inside the housing 26 and submerging the pumps 21 and 24 beneath the water level in the sump 17 significantly reduces operational noise. Submerging the float valve 12 operational mechanisms beneath the water level in the sump 17 keeps the exterior of the valve wet at all times, thereby preventing failure from salt creep, in salt water systems, and mineral deposits.

It is contemplated that certain equivalents and substitutions for elements and components set forth above may be obvious to those skilled in the art, and therefore the true scope and definition of the invention is to be as set forth in the following claims.

What is claimed is:

1. An aquarium filtering system comprising:
    a filter system housing having a sump to retain filtered water drawn from an aquarium;
    a drain conduit to deliver water to said filter system housing from an aquarium;
    a return conduit to return said filtered water from said filter system housing to an aquarium;
    a return pump to remove said filtered water from said sump and force said filtered water through said return conduit;
    at least one float valve to control flow of water through said drain conduit; and
    pre-filter means disposed upstream of said at least one float valve, such that water passing through said drain conduit is filtered prior to passage through said at least one float valve, said pre-filter means comprising a sealed filter housing connected to said drain conduit downstream of said aquarium and enclosing a filter wherein flow into said sealed filter housing occurs only through said drain conduit;
    whereby said at least one float valve controls flow of water through said drain conduit in response to the level of said filtered water within said sump.

2. The system of claim 1, further comprising filter means for filtering water that has passed through said at least one float valve.

3. The system of claim 1, wherein said pre-filter means is disposed within said filter system housing.

4. The system of claim 1, wherein said at least one float valve is submerged within said filtered water within said sump.

5. The system of claim 1, wherein said return pump is submerged within said filtered water within said sump.

6. The system of claim 2, wherein said pre-filter means is disposed within said filter system housing.

7. The system of claim 2, wherein said at least one float valve is submerged within said filtered water within said sump.

8. The system of claim 2, wherein said return pump is submerged within said filtered water within said sump.

9. The system of claim 3, wherein said at least one float valve is submerged within said filtered water within said sump.

10. The system of claim 3, wherein said return pump is submerged within said filtered water within said sump.

11. The system of claim 4, wherein said return pump is submerged within said filtered water within said sump.

12. The system of claim 1, said pre-filter means further comprising a sock filter.

13. The system of claim 5, further comprising an internal pump submerged within said filtered water within said sump.

14. An aquarium filtering system adapted to remove water from, filtering and returning water to an aquarium, said system comprising:

a filter system housing having a sump;

a drain conduit to deliver water to said filter system housing from an aquarium;

a float valve to control water flow through said drain conduit to said sump; and pre-filter means disposed upstream of said float valve, such that water passing through said drain conduit is filtered prior to passage through said float valve, said pre-filter means comprising a sealed filter housing connected to said drain conduit downstream of said aquarium and enclosing a filter wherein flow into said sealed filter housing occurs only through said drain conduit.

15. The system of claim 14, wherein said float valve is positioned within said sump.

16. The system of claim 14, further comprising a return pump to empty said sump, wherein said return pump is positioned within said sump.

17. The system of claim 15, further comprising a return pump to empty said sump, wherein said return pump is positioned within said sump.

18. The system of claim 17, further comprising filter means to filter water passing through said float valve.

19. The system of claim 17, wherein said pre-filter means comprises a filter sock.

20. An aquarium filtering system for removing water from an aquarium, filtering such water, and returning filtered water to such aquarium, wherein such water is removed from such aquarium by gravity effects, said system comprising:

an aquarium containing water;

a filter system housing comprising a sump to retain filtered water;

a float valve controlling flow of said water from said aquarium into said filter system housing, wherein said float valve is responsive to the level of said filtered water in said sump, and wherein said float valve is disposed within said sump;

a drain conduit connecting said aquarium to said float valve;

pre-filter means disposed between said aquarium and said float valve, such that water from said aquarium is filtered prior to passage into said float valve, said pre-filter means comprising a sealed filter housing connected to said drain conduit downstream of said aquarium and enclosing a filter wherein flow into said sealed filter housing occurs only through said drain conduit;

a return conduit connecting said filter system housing to said aquarium; and a return pump to return water to said aquarium from said sump through said return conduit, wherein said return pump is disposed within said sump.

* * * * *